June 10, 1930. T. H. DOLLING 1,763,422
BEET GRIPPING AND CONVEYING MEANS
Filed Nov. 15, 1928
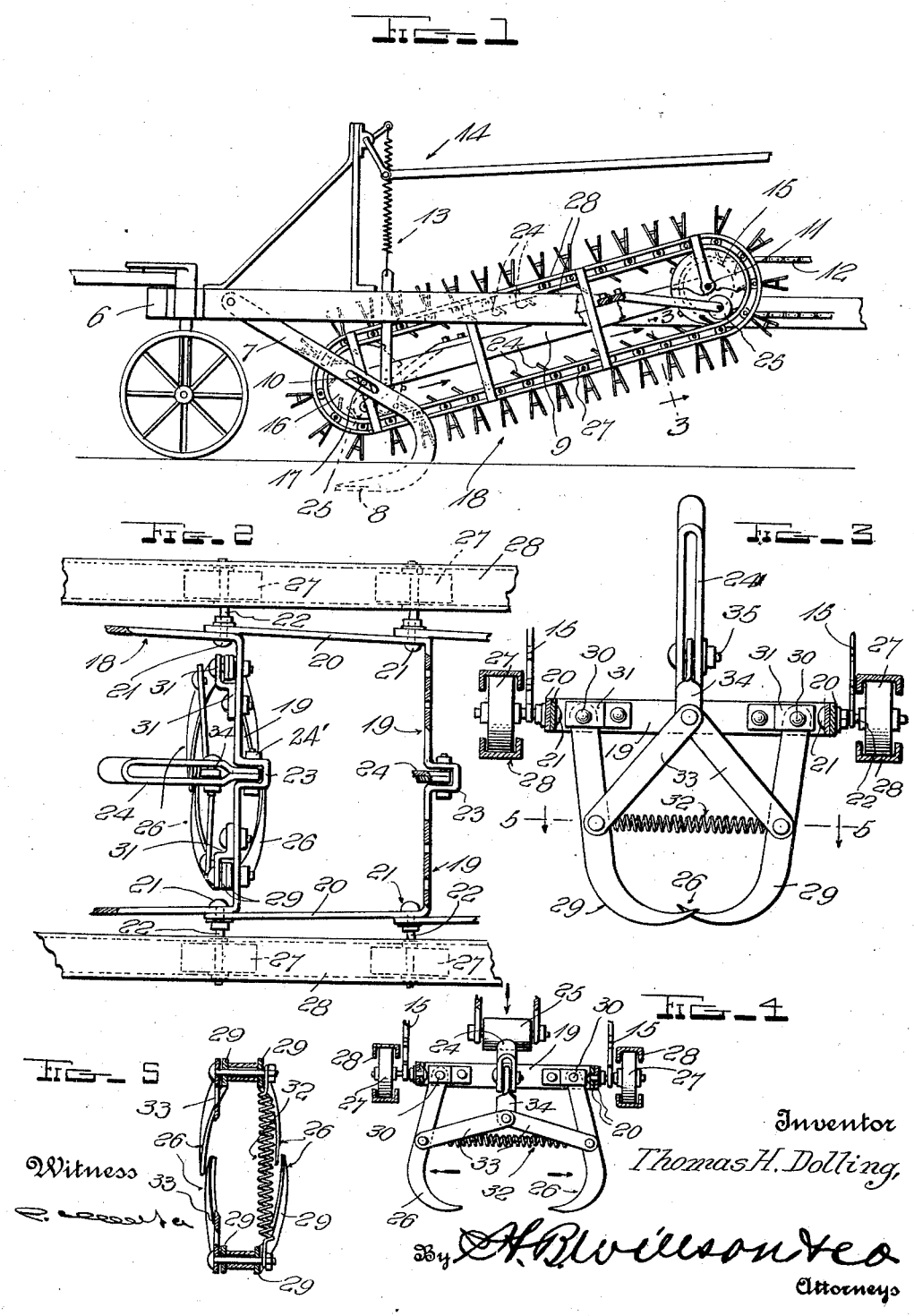
Inventor
Thomas H. Dolling,
By
Attorneys Patented June 10, 1930

1,763,422

UNITED STATES PATENT OFFICE

THOMAS H. DOLLING, OF HUNTINGTON PARK, CALIFORNIA, ASSIGNOR OF ONE-HALF TO RUSSELL McTAGGART, OF HUNTINGTON PARK, CALIFORNIA

BEET GRIPPING AND CONVEYING MEANS

Application filed November 15, 1928. Serial No. 319,599.

The invention relates to improvements in beet harvesters and has reference more particularly to a novel mechanism for gripping the loosened beets in the ground and conveying them upwardly and rearwardly to be acted upon by an appropriate topping mechanism.

The beet conveying means embodies an endless chain, a plurality of spring-closed beet grippers carried by said chain and having operating levers projecting inwardly from said chain and means such as rollers for outwardly forcing said levers to open the grippers at the proper times, and it is a further object of the invention to provide novel means for holding the chain against outward movement when said levers are outwardly forced in this manner.

A still further object is to provide a chain structure of simple, inexpensive and efficient form.

With the foregoing in view, the invention resides in the novel subject matter hereinafter described and claimed, description being accomplished by reference to the accompanying drawing.

Fig. 1 is a side elevation partly broken away showing the front portion of a beet harvester embodying the invention.

Fig. 2 is an enlarged top plan view partly in section showing a portion of the chain and associated parts.

Fig. 3 is an enlarged vertical transverse sectional view on line 3—3 of Fig. 1, the beet gripper being in its normally closed position.

Fig. 4 is a view similar to Fig. 3 but showing the beet gripper opened.

Fig. 5 is a horizontal sectional view on line 5—5 of Fig. 3.

In the drawing above briefly described, 6 denotes a portion of the main frame of a beet harvester. To the front end of this frame, beams such as 7 are pivoted for upward swinging, and the lower end of each beam is provided with a beet loosening blade 8. Extending upwardly and rearwardly from the beams 7, is a supporting frame 9 for the beet gripping and conveying means, said frame having a combined sliding and pivotal connection 10 with said beams permitting simultaneous raising and lowering of the front end of the frame and the beams. The rear end of frame 9 is pivotally supported by a transverse shaft 11 mounted on the frame 6, and this shaft is driven by appropriate means embodying a chain 12. Suitable suspending means 13 extends upwardly from the front end of the frame 9 and is connected with appropriate means 14 whereby the frame and the beams 7 may be raised and lowered as desired.

Secured to the shaft 11, are two laterally spaced chain-guiding and driving sprocket wheels 15 and two chain-guiding wheels 16 are mounted on a shaft 17 at the front end of the frame 9. Trained around these sprocket wheels and driven by the wheels 15, is a novel chain structure 18 whose details of construction are shown most clearly in Fig. 2. This chain 18 is formed of a plurality of U-shaped links 19 each bent from a single metal bar. The arms 20 of these links 19 all extend in the same direction and overlap each other, and transverse pivots 21 connect these overlapped arms, said pivots being laterally extended from the frame to provide spindles 22 for a purpose to appear. The arm-connecting portion of each link 19 is provided with a U-shaped formation 23 at its center, and in these U-shaped formations oblique levers 24 are fulcrumed at one end, as indicated at 24' in Fig. 2. These levers extend longitudinally of the chain 18 and project inwardly from it as illustrated in Fig. 1. These levers and a pair of rollers 25 which are fixedly mounted in their path, serve to open the normally closed beet grippers 26 which are carried by the chain 18, and to hold this chain against outward movement and consequent strain when the levers are outwardly forced in this manner, I provide rollers 27 at the outer ends of the spindles 22, said rollers being engaged with two continuous trackways 28 which are appropriately mounted upon the frame 9. The sprockets 15—16 are disposed at the inner sides of the trackways and the teeth of said sprockets engage the inner end portions of the spindles 22, as seen in Fig. 4.

Preferably, each beet gripper 26 comprises two twin hooks 29 pivoted at 30 between the arm-connecting portions of the links 18 and brackets 31 which are secured to said portion. Coiled springs 32 extend between and are connected with the hooks 29 to normally close them as seen in Fig. 3. Toggle links 33 however, and additional links 34 connected to the pivoted ends of said toggle links, co-act with the levers 24 in effecting opening of the grippers, the links 34 being pivoted at 35 to said levers.

The foremost of the rollers 25 outwardly forces the levers 24 as they travel rearwardly thereunder and hence the grippers 26 are at this time opened to straddle the loosened beets. As soon as the levers 24 pass this roller, the springs 32 close the grippers upon the beets with the result that the latter are carried upwardly and rearwardly. When levers 24 engage the rearmost of the rollers 25, said levers are again moved to effect opening of the grippers 26, thereby delivering the beets to the topping mechanism (forming no part of this invention and not illustrated). Upon each outward movement of the levers 24, the rollers 27 and tracks 28 hold the chain 18 against outward shifting so that said chain cannot be drawn excessively tight and placed under undue strain. Moreover, as the chain cannot outwardly move away from the rollers 25, it is insured that the levers 24 shall be moved to the maximum for properly opening the grippers 26, which maximum movement would not be permitted were the chain not held against outward shifting.

Attention is invited to the fact that the entire structure is comparatively simple and inexpensive, yet is efficient, reliable and in every way desirable. The general construction disclosed is preferably followed but within the scope of the invention as claimed, variations may be made.

I claim:—

1. In a beet gripping and conveying means, a chain composed of a plurality of one-piece U-shaped links having their arms all disposed in the same direction and overlapped, pivots passing through said overlapped arms and projecting outwardly therefrom to form spindles, spring-closed beet grippers mounted on the transverse arm-connecting portions of said links, levers fulcrumed to the centers of said arm-connecting portions and operatively connected with said grippers for opening the latter upon outward swinging of the levers, and rollers on the outer ends of said spindles, and stationary tracks engaging said rollers for holding the chain against outward movement upon outward forcing of said levers.

2. A structure as specified in claim 1; said arm-connecting portions of said links having U-shaped central portions receiving one end of said levers, the lever fulcrums being passed through said lever ends and the sides of said U-shaped portions.

In testimony whereof I have hereunto affixed my signature.

THOMAS H. DOLLING.